(12) United States Patent
Lee et al.

(10) Patent No.: US 7,932,986 B2
(45) Date of Patent: Apr. 26, 2011

(54) LIQUID CRYSTAL DISPLAY COMPRISING A FIRST SIGNAL LINE INCLUDING A FIRST PORTION AND SECOND PORTION, WHEREIN THE CROSS-SECTION OF THE SECOND PORTION IS THINNER THAN THE CROSS-SECTION OF THE FIRST PORTION, AND WHEREIN A SPACER OVERLAPS THE SECOND PORTION

(75) Inventors: Yui-Ku Lee, Gwangmyeong-si (KR); Chul Huh, Yongin-si (KR); Jin-Seuk Kim, Daejeon-si (KR); Byoung-Joo Kim, Anyang-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 467 days.

(21) Appl. No.: 12/170,000

(22) Filed: Jul. 9, 2008

(65) Prior Publication Data

US 2009/0185094 A1 Jul. 23, 2009

(30) Foreign Application Priority Data

Jan. 17, 2008 (KR) ........................ 10-2008-0005449

(51) Int. Cl.
*G02F 1/1339* (2006.01)
(52) U.S. Cl. ........................................ 349/157; 349/156
(58) Field of Classification Search .................. 349/155, 349/156, 157
See application file for complete search history.

(56) References Cited

U.S. PATENT DOCUMENTS

| 2006/0033878 | A1 | 2/2006 | Sawasaki |
| 2007/0002265 | A1* | 1/2007 | Kwak et al. .................... 349/156 |
| 2007/0069204 | A1 | 3/2007 | Jang et al. |
| 2007/0139597 | A1* | 6/2007 | Shim et al. .................... 349/139 |
| 2007/0182888 | A1 | 8/2007 | Inoue et al. |

FOREIGN PATENT DOCUMENTS

| JP | 2004-219529 | 8/2004 |
| JP | 2005-234570 | 9/2005 |
| JP | 2005-326887 | 11/2005 |
| JP | 2007-052262 | 3/2007 |
| JP | 2007-171715 | 7/2007 |
| JP | 2007-192944 | 8/2007 |
| KR | 1020050070367 | 7/2005 |
| KR | 1020060000279 | 1/2006 |
| KR | 1020070076842 | 7/2007 |

\* cited by examiner

*Primary Examiner* — Mark A Robinson
*Assistant Examiner* — Dennis Y Kim
(74) *Attorney, Agent, or Firm* — F. Chau & Associates, LLC

(57) ABSTRACT

A liquid crystal display includes a first substrate, a first signal line formed on the first substrate, the first signal line including a first portion and a second portion, wherein the second portion is thinner than the first portion, a second signal line insulated from the first signal line, the second signal line crossing the first signal line, a thin film transistor connected to the second signal line, a pixel electrode connected to the thin film transistor, an insulating layer formed on the first signal line, the second signal line, and the thin film transistor, the insulating layer including a first portion and a second portion, a first spacer formed on the first portion of the insulating layer, and a second spacer formed on the second portion of the insulating layer, wherein the second portion of the insulating layer overlaps the second portion of the first signal line, and the first portion and the second portion of the insulating layer have different surface heights.

21 Claims, 10 Drawing Sheets

LIQUID CRYSTAL DISPLAY COMPRISING A FIRST SIGNAL LINE INCLUDING A FIRST PORTION AND SECOND PORTION, WHEREIN THE CROSS-SECTION OF THE SECOND PORTION IS THINNER THAN THE CROSS-SECTION OF THE FIRST PORTION, AND WHEREIN A SPACER OVERLAPS THE SECOND PORTION

CROSS-REFERENCE TO RELATED APPLICATION

This application claims priority to Korean Patent Application No. 10-2008-0005449 filed on Jan. 17, 2008, the entire contents of which are incorporated herein by reference.

BACKGROUND OF THE INVENTION (a) Technical Field

The present disclosure relates to a display device, and more particularly, to a liquid crystal display including spacers.

(b) Discussion of the Related Art

A liquid crystal display is a flat panel display. The liquid crystal display includes two display panels where field generating electrodes such as pixel electrodes and a common electrode are formed. A liquid crystal layer is interposed between the two display panels. Spacers uniformly maintaining the interval between the two display panels are interposed between the two display panels. In the liquid crystal display, an electric field is generated to a liquid crystal layer by applying voltages to the field generating electrodes such that the directions of liquid crystal molecules of the liquid crystal layer are determined and the polarization of incident light is controlled, thereby displaying images.

A dual column spacer structure includes a main spacer and an auxiliary spacer. The main spacer is formed close to the two display panels. One end of the auxiliary spacer is formed away from one of the two display panels. The main spacer and the auxiliary spacer can be formed on the display panel where the common electrode is formed. The main spacer and the auxiliary spacer have different lengths.

The manufacturing process becomes complicated when forming the two kinds of spacers.

SUMMARY OF THE INVENTION

According to an exemplary embodiment of the present invention, a liquid crystal display includes a first substrate, a first signal line formed on the first substrate, the first signal line including a first portion and a second portion, the second portion is thinner than the first portion, a second signal line insulated from the first signal line, the second signal line crossing the first signal line, a thin film transistor connected to the second signal line, a pixel electrode connected to the thin film transistor, an insulating layer formed on the first signal line, the second signal line, and the thin film transistor, and including a first portion and a second portion, a first spacer formed on the first portion of the insulating layer, and a second spacer formed on the second portion of the insulating layer, wherein the second portion of the insulating layer overlaps the second portion of the first signal line, and the first portion and the second portion of the insulating layer have different surface heights.

The insulating layer may comprise an organic material layer.

The liquid crystal display may further include a second substrate facing the first substrate, wherein the second substrate may contact the first spacer and may be separated from the second spacer.

The second portion of the first signal line may be separated from the second signal line and the thin film transistor.

The first portion of the insulating layer may overlap the thin film transistor.

The lengths of the first spacer and the second spacer may be substantially the same.

The interval between the second spacer and the second substrate may be in a range of about 0.3 µm to about 0.5 µm.

The difference between the surface height of the first portion of the insulating layer and the surface height of the second portion of the insulating layer may be in a range of about 0.3 µm to about 0.5 µm.

The cross-section of first spacer may be substantially the same as the cross-section of the second spacer.

The cross-section of the first spacer and the second spacer may be substantially circular, and the diameter of the widest cross-section of the first spacer and the second spacer may be in a range of about 17 µm to about 20 µm.

The insulating layer may be a color filter including pigments. The color filter may include blue pigments.

The liquid crystal display may further include an insulating layer formed between the thin film transistor and the insulating layer or on the insulating layer.

The liquid crystal display may further include a passivation layer formed between the thin film transistor and the insulating layer, and a capping layer formed on the insulating layer.

The thin film transistor may be connected to the first signal line.

The liquid crystal display may further include a third signal line formed with the same layer as the first signal line, crossing the second signal line, and connected to the thin film transistor. The first signal line may have a wider width near the second portion of the first signal line than at remaining portions of the first signal line.

According to an exemplary embodiment of the present invention, a liquid crystal display includes, a first substrate, a plurality of gate lines formed on the first substrate and including first portions and second portions, wherein the second portions are thinner than the first portions, a gate insulating layer formed on the gate lines, a plurality of data lines formed on the gate insulating layer, crossing the gate lines to thereby define a plurality of pixel areas, and including source electrodes, a plurality of drain electrodes facing the source electrodes with an interval therebetween, a plurality of color filters formed on the gate lines, the gate insulating layer, the data lines, and the drain electrodes, and including first portions and second portions, first spacers formed on the first portions of the color filters; second spacers formed on the second portions of the color filters, and a second substrate facing the first substrate, contacting the first spacers, and separated from the second spacers, wherein the second portions of the color filters overlap the second portions of the gate lines, heights of a surface of the first portions and a surface of the second portions of the color filters are different, color filters of red, green, and blue are alternately disposed in the pixel areas, and the first spacers and the second spacers are disposed on only the blue color filters and not on the red and green color filters.

The second portions of the gate lines may be separated from the source electrodes and the drain electrodes.

The first portions of the color filters may overlap the source electrodes and the drain electrodes.

According to an exemplary embodiment of the present invention, the spacer is formed on the curved surface of the insulating layer such that the main spacer and the auxiliary spacer may have substantially the same length. Furthermore, it is not necessary for the main spacer and the auxiliary spacer to have different lengths.

According to an exemplary embodiment of the present invention, it is not necessary to use incomplete exposing to form the main spacer and the auxiliary spacer to have the different lengths such that the main spacer and the auxiliary spacer may have the same cross-section. Accordingly, it is not necessary for the cross-section of the main spacer to be larger than the cross-section of the auxiliary spacer, and the main spacer and the auxiliary spacer may have a minimum size such that the aperture ratio of the liquid crystal display may be improved. The cross-section of the spacer is decreased such that the compression characteristic is increased to thereby improve the liquid crystal margin.

BRIEF DESCRIPTION OF THE DRAWINGS

Exemplary embodiments of the present invention can be understood in more detail from the following descriptions taken in conjunction with the accompanying drawings, wherein.

DETAILED DESCRIPTION OF EXEMPLARY EMBODIMENTS

The invention is described more fully hereinafter with reference to the accompanying drawings, in which exemplary embodiments of the invention are shown. This invention may, however, be embodied in many different forms and should not be construed as limited to the exemplary embodiments set forth herein.

It will be understood that when an element such as a layer, film, region, or substrate is referred to as being "on" another element, it can be directly on the other element or intervening elements may also be present.

A display device according to an exemplary embodiment of the present invention is described with reference to FIG. 1 to FIG. 3.

Figure 1:
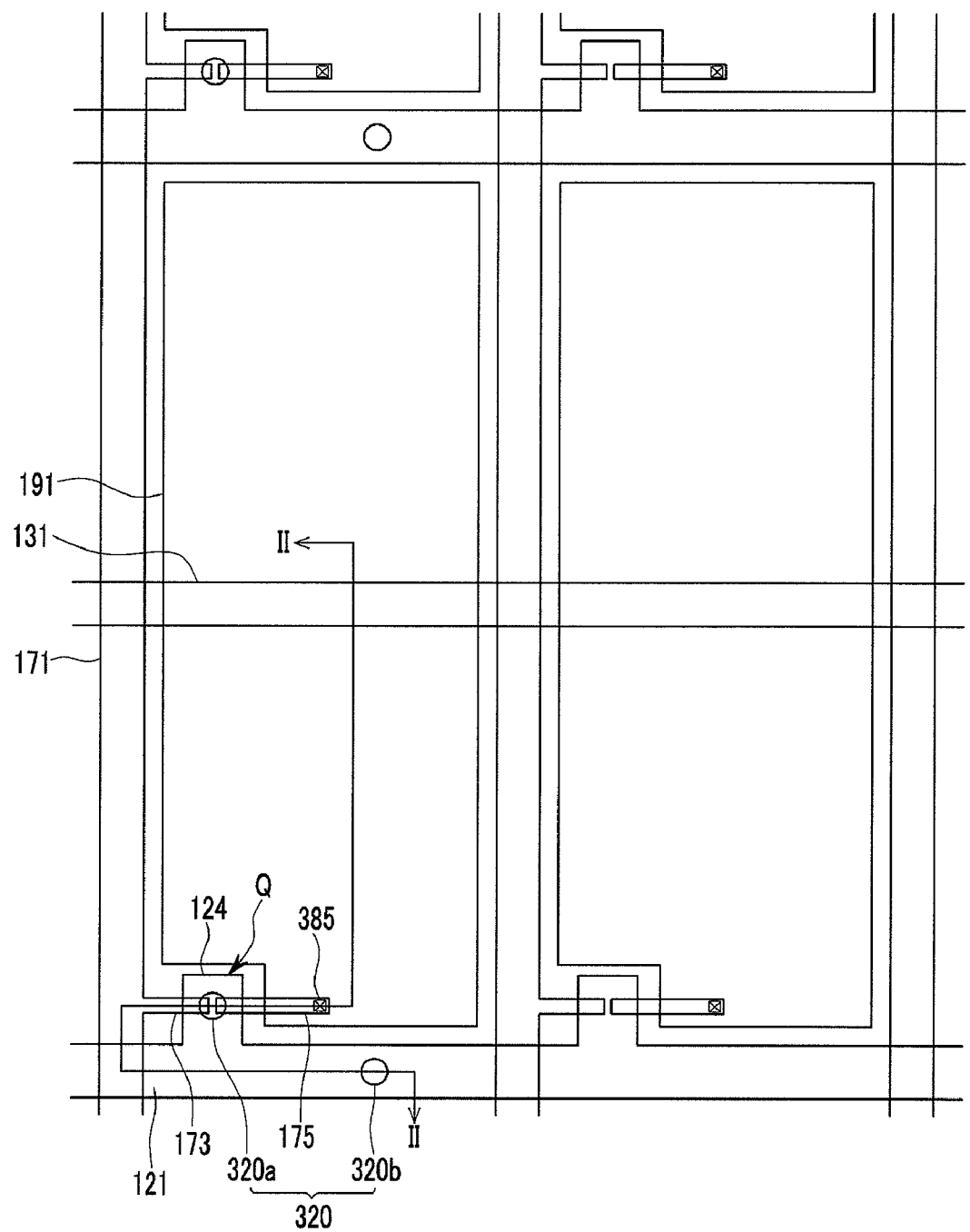
FIG. 1 is a layout view of a liquid crystal display according to an exemplary embodiment of the present invention.

FIG. 1 is a layout view of a liquid crystal display according to an exemplary embodiment of the present invention. FIG. 2 is a cross-sectional view of a liquid crystal display shown in FIG. 1 taken along the line II-II. FIG. 3 is a cross-sectional view of a liquid crystal display according to an exemplary embodiment of the present invention.

Figure 2:
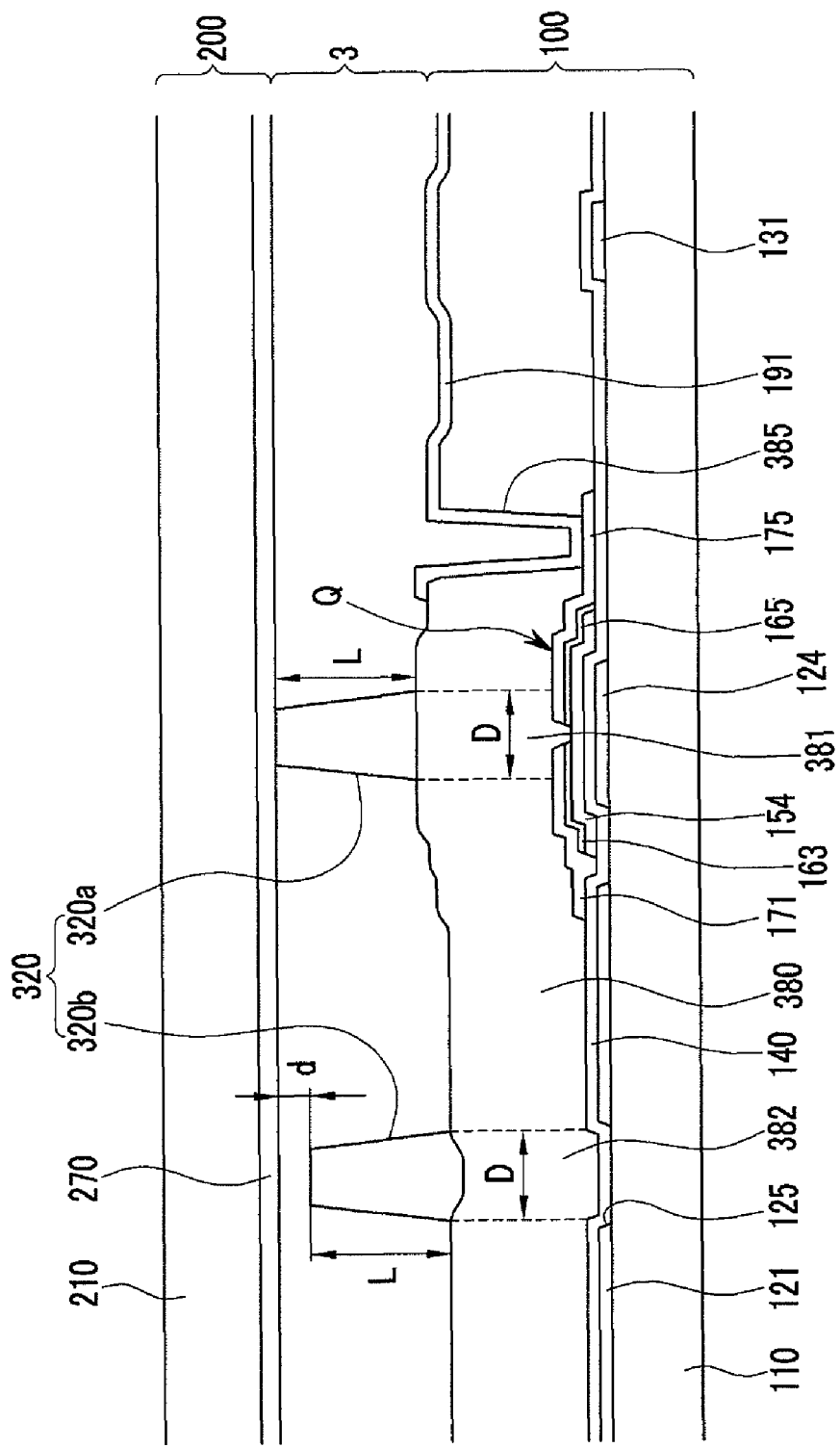
FIG. 2 is a cross-sectional view of a liquid crystal display shown in FIG. 1 taken along the line II-II.
Figure 3:
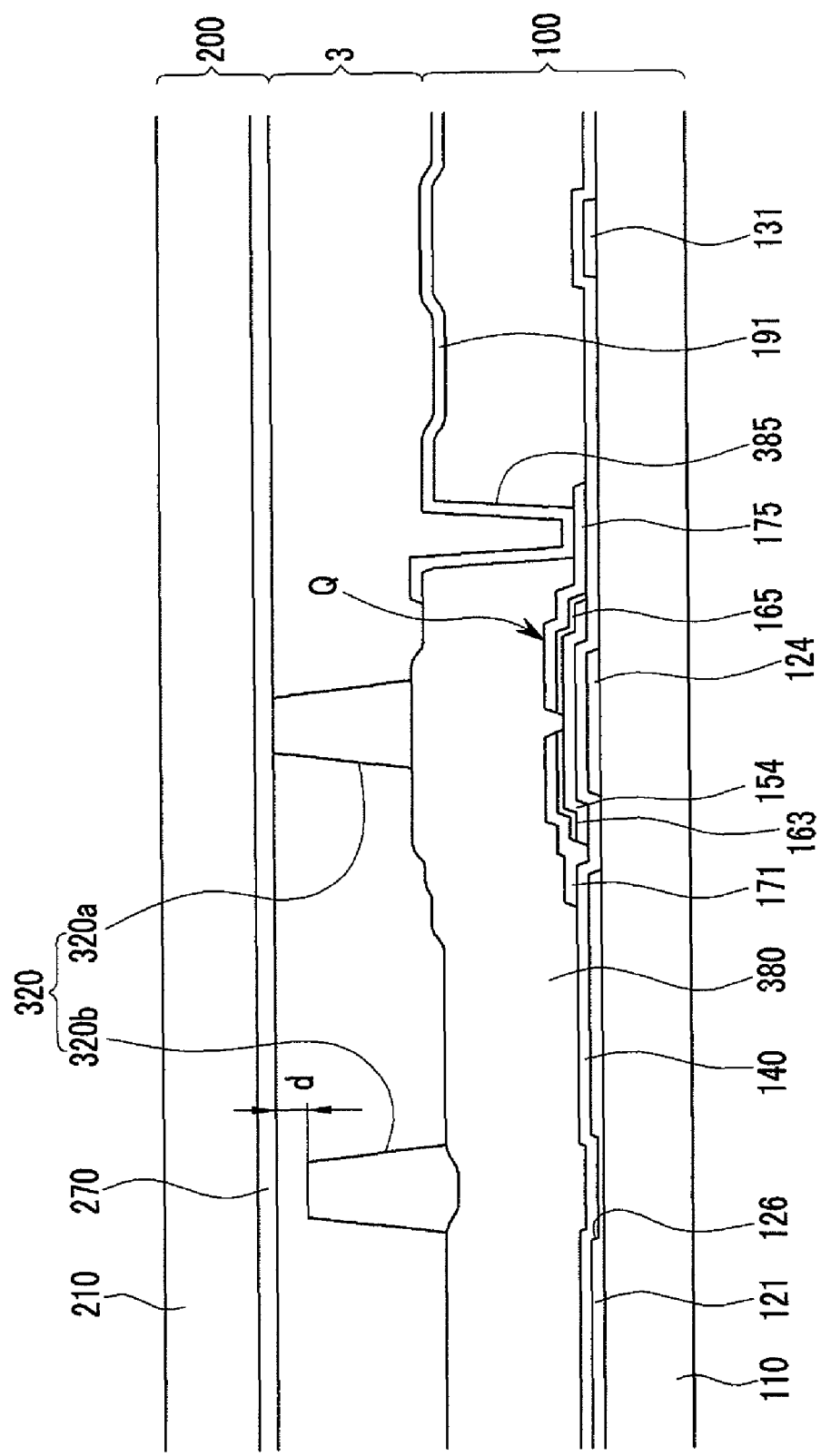
FIG. 3 is a cross-sectional view of a liquid crystal display according to an exemplary embodiment of the present invention.

Referring to FIG. 1 to FIG. 3, a liquid crystal display includes a thin film transistor array panel 100, a common electrode panel 200 facing the thin film transistor array panel 100, and a liquid crystal layer 3 and a plurality of spacers 320 formed between two display panels 100 and 200.

A plurality of gate lines 121 and a plurality of storage electrode lines 131 are formed on a substrate 110 comprising an insulating material such as, for example, glass or plastic. A gate insulating layer 140, a plurality of semiconductors 154, a plurality of ohmic contacts 163 and 165, a plurality of data lines 171 and a plurality of drain electrodes 175 are formed thereon.

The gate lines 121 transmit gate signals and may extend in a horizontal direction. Each gate line 121 includes a plurality of gate electrodes 124 protruding upwardly. A plurality of openings 125 (referring to FIG. 2) or a plurality of subsidence portions 126 (referring to FIG. 3) are formed in the centers of the gate lines 121. The planar shapes of the openings 125 and the subsidence portions 126 may be approximately circular. The width of the gate lines 121 is larger than a diameter of the openings 125 and the subsidence portions 126. The portion where the openings 125 and the subsidence portions 126 are disposed among the gate lines 121 may be wider than the other portions.

The storage electrode lines 131 receive a predetermined voltage such as a common voltage, and are substantially parallel to the gate lines 121. Each of the storage electrode lines 131 is disposed between two adjacent gate lines 121 and maintains the same interval from the two adjacent gate lines 121.

The data lines 171 transmit data signals and substantially extend in a vertical direction to cross the gate lines 121. Each data line 171 includes a plurality of source electrode 173 extending toward the gate electrodes 124. The drain electrodes 175 are separated from the data lines 171, and face the source electrodes 173 with respect to the gate electrodes 124.

The openings 125 and the subsidence portions 126 of the gate lines 121 do not overlap the data lines 171.

The semiconductors 154 are disposed on the gate electrodes 124. The ohmic contacts 163 and 165 are disposed between the semiconductors 154 and the data lines 171 and between the semiconductors 154 and drain electrodes 175 to reduce contact resistance therebetween.

The gate electrode 124, the source electrode 173, and the drain electrode 175 form a thin film transistor (TFT) Q along with a semiconductor 154. The channel of the thin film transistor Q is formed in the semiconductor 154 between the source electrode 173 and the drain electrode 175.

An insulating layer 380 is formed on the gate insulating layer 140, the data lines 171, and the drain electrodes 175. The insulating layer 380 may comprise an organic material, and the insulating layer 380 may be a color filter including pigments. When the insulating layer 380 is the color filter, the insulating layer 380 may display, for example, one of three primary colors of red, green, and blue.

The surface of the insulating layer 380 can be curved or embossed according to heights of structures formed thereunder. Accordingly, heights of the insulating layer 380 with respect to the substrate 110 can vary. In an embodiment, the thickness of the insulating layer 380 may be uniform. In another embodiment, a thickness deviation of the insulation layer 380 is less than the surface height deviation when the thickness is not uniform.

The source electrode 173, the drain electrode 175, the ohmic contacts 163 and 165, the semiconductor 154, the gate insulating layer 140, and the gate electrode 124 are stacked and overlap a first portion 381 of the insulating layer 380. The first portion 381 overlaps the thin film transistor Q. The gate insulating layer 140 is formed under a second portion 382 of the insulating layer 380 overlapping the opening 125 of the gate line 121. Accordingly, the upper surface of the first portion 381 is higher than the upper surface of the second portion 382, and a difference between their heights may be in a range of about 0.3 μm to about 0.5 μm.

A height of each portion of the insulating layer 380 from the substrate 110 is increased according to an increase of the height of the structures formed thereunder. The degree of the increase of the surface height of the insulating layer 380 according to the increase of heights of the structures may be changed according to the material of the insulating layer 380. When the insulating layer 380 is a color filter, the height may be changed according to the pigment included in the color filter even if all the other ingredients are the same. For example, when the color filter including the red, green, and blue pigments is formed on the structures of a terraced profile, the height difference of the upper surface of the green color filter may be the largest and the height difference of the upper surface of the blue color filter may be the smallest.

The insulating layer 380 has a plurality of contact holes 385 exposing the drain electrodes 175.

Pixel electrodes 191 are formed on the insulating layer 380. The pixel electrodes 191 can comprise a transparent conductive material such as, for example, ITO (indium tin oxide) or IZO (indium zinc oxide), or a reflective metal such as, for example, aluminum, or a silver alloy. The pixel electrodes 191 are connected to the drain electrodes 175 through the contact holes 385.

The common electrode panel 200 faces the thin film transistor array panel 100 and includes a common electrode 270 formed on a substrate 210. In an exemplary embodiment, the common electrode 270 may be formed on the thin film transistor array panel 100. A light blocking member (not shown) may be formed between the substrate 210 and the common electrode 270. In an exemplary embodiment, the light blocking member may be formed on the thin film transistor array panel 100.

The liquid crystal layer 3 is disposed between the common electrode panel 200 and the thin film transistor array panel 100.

The spacers 320 are formed between the common electrode panel 200 and the thin film transistor array panel 100. The thickness of the liquid crystal layer 3 may be determined by the spacers 320.

One spacer 320 includes a main spacer 320a and an auxiliary spacer 320b. The length L and the cross-sectional size thereof are substantially the same. The cross-section of the spacers 320 is substantially circular, and the diameter of the cross-section may be in a range of about 17 μm to about 20 μm. The spacers 320 may be formed by photolithography using a material such as, for example, a photosensitive organic material, and the cross-section of the spacers 320 may be different according to their length direction. In an exemplary embodiment, the diameter of the widest cross-section of the spacer 320 may be in a range of about 17 μm to about 20 μm.

In an exemplary embodiment, the main spacer 320a and auxiliary spacer 320b have a minimized size such that the compression characteristic may be increased and the liquid crystal margin may be improved, and the aperture ratio may be improved.

The main spacer 320a overlaps the thin film transistor Q, and the auxiliary spacer 320b overlaps the opening 125 or the subsidence portion 126 of the gate line 121. Accordingly, the surface of the main spacer 320a is higher than the surface of the auxiliary spacer 320b with respect to the substrate 110.

The main spacer 320a contacts the common electrode panel 200, and maintains a uniform interval between the thin film transistor array panel 100 and the common electrode panel 200. The main spacer 320a is elastic such that it may be compressed against an external force and then returned to its original state.

The auxiliary spacer 320b is separated from the common electrode panel 200. When an external force of more than a particular value is exerted on the main spacer 320a, the auxiliary spacer 320b contacts the common electrode panel 200 such that the external force exerted on the main spacer 320a is dispersed. Accordingly, damage to the main spacer 320a may be prevented.

In an exemplary embodiment, the dual spacers of the main spacer 320a and the auxiliary spacer 320b are compressed such that the liquid crystal margin is increased when compared with a case when a single spacer is compressed. Accordingly, an active unfilled area (AUA) deterioration, where the liquid crystal amount is partially insufficient, thereby generating light leakage and gravity deterioration, where the liquid crystal is gathered to the direction of gravity, may be prevented.

The interval d between the auxiliary spacer 320b and the common electrode panel 200 may be in a range of about 0.3 μm to about 0.5 μm. If the interval d between the auxiliary spacer 320b and the common electrode panel 200 is less than 0.3 μm, the liquid crystal margin is insufficient such that the AUA deterioration may be generated. If the interval d between the auxiliary spacer 320b and the common electrode panel 200 is larger than 0.5 μm, the external force exerted on the main spacer 320a is not sufficiently dispersed such that the main spacer 320a may be damaged. The interval d between the auxiliary spacer 320b and the common electrode panel 200 may be substantially the same as the height difference between the first portion 381 and the second portion 382 of the insulating layer 380. Accordingly, the predetermined interval d may be changed according the thickness of the gate line 121 and the material of the insulating layer 380.

The main spacers 320a and the auxiliary spacers 320b are disposed between two neighboring data lines 171. When the insulating layer 380 is a group of color filters with various colors, the main spacers 320a and the auxiliary spacers 320b may only be disposed on color filters of one color. This is in consideration of an appropriate interval that may be obtained between the auxiliary spacers 320b and the common electrode panel 200 and the height difference of the surface of each of the color filters. For example, the main spacer 320a and the auxiliary spacer 320b may be disposed on the blue color filter, but not on the red and green color filters.

According to an exemplary embodiment of the present invention, because the spacers 320 are disposed on the curved or embossed surface of the insulating layer 380, the main spacer 320a and the auxiliary spacer 320b may be formed with a same shape and size. Therefore, the manufacturing process is simple and the shape and size of the spacers 320 may be precisely controlled.

When forming the spacers 320, a photosensitive organic layer (not shown) is coated on the thin film transistor array panel 100. The thickness of the organic layer is substantially uniform.

Next, a mask (not shown) including a spacer pattern is aligned with the organic layer. The spacer pattern formed in the mask for forming the main spacer 320a and the auxiliary spacer 320b has substantially a same shape and size.

Next, light is irradiated on the organic layer through the mask, and the organic layer is exposed and developed to form the main spacer 320a and the auxiliary spacer 320b.

In an exemplary embodiment, to form a main spacer and an auxiliary spacer having a different length, the mask includes slits or a semi-transmittance layer for partial exposing such that the cross-section of the main spacer and the auxiliary spacer may be different. The cross-section of the main spacer having the long length may be larger than the cross-section of the auxiliary spacer. To reduce the reduction of the aperture ratio, the cross-section of the spacer is manufactured as a minimum, and if the cross-section of the auxiliary spacer is adjusted to a minimum size, the main spacer has a larger cross-section than the auxiliary spacer.

In an exemplary embodiment, the main spacer 320a and the auxiliary spacer 320b may have the same cross-sections with the minimum size, such that it is not necessary to perform the partial exposing. Therefore, the aperture ratio of the liquid crystal display is increased.

A liquid crystal display according to an exemplary embodiment of the present invention is described with reference to FIG. 4 and FIG. 5.

Figure 4:
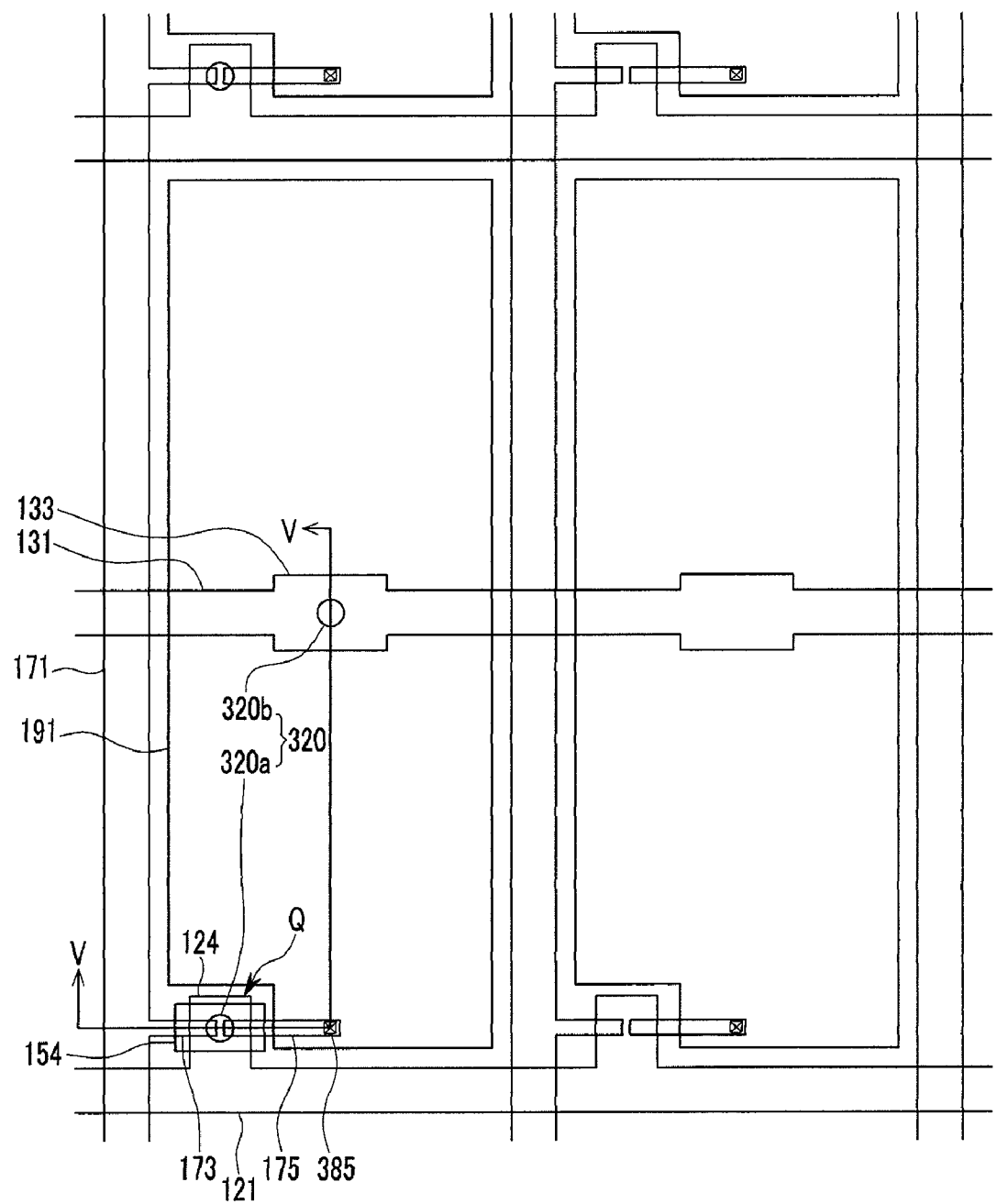
FIG. 4 is a layout view of a liquid crystal display according to an exemplary embodiment of the present invention.

FIG. 4 is a layout view of a liquid crystal display according to an exemplary embodiment of the present invention. FIG. 5 is a cross-sectional view of the liquid crystal display shown in FIG. 4 taken along the line V-V.

Figure 5:
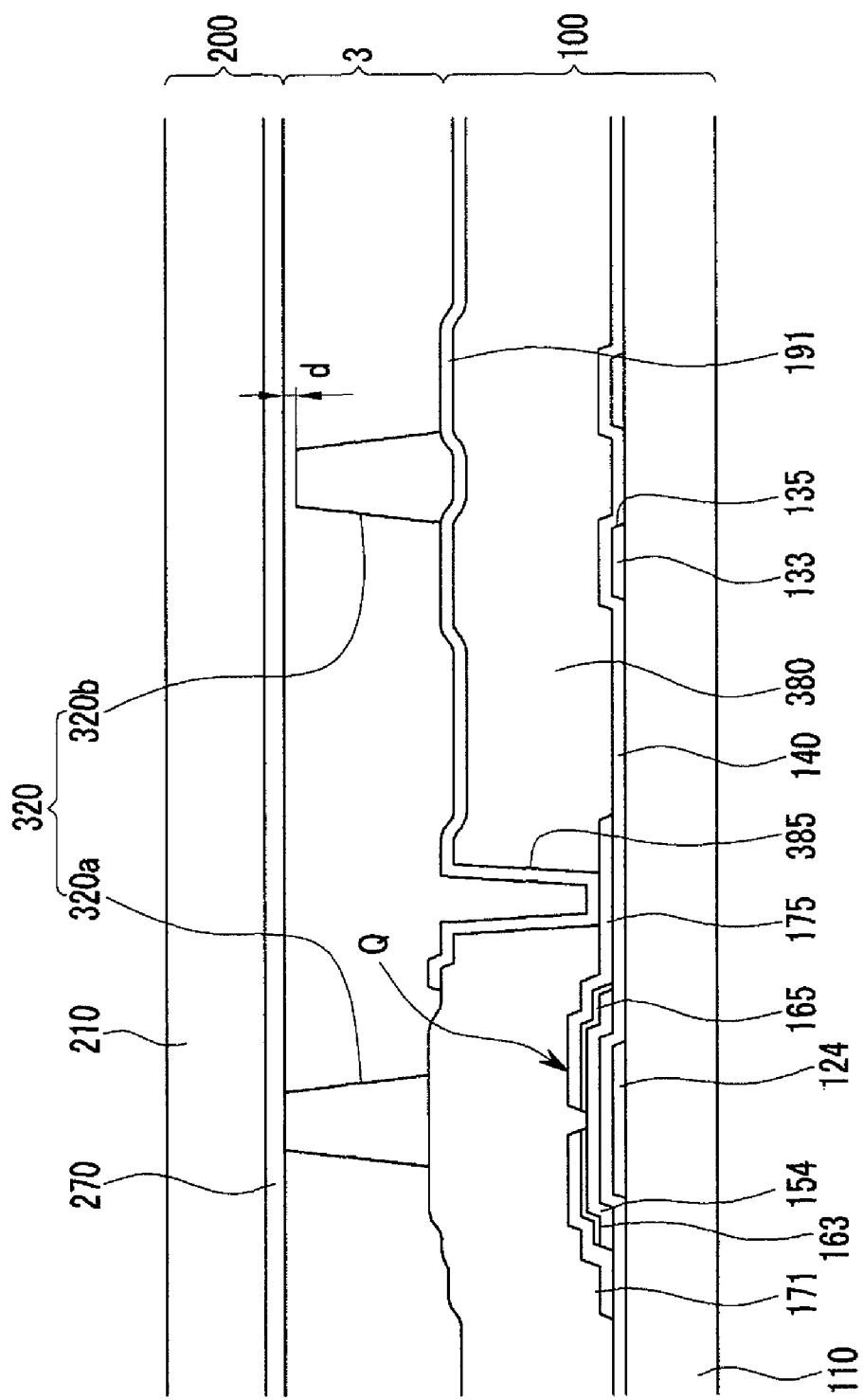
FIG. 5 is a cross-sectional view of a liquid crystal display shown in FIG. 4 taken along the line V-V.

Referring to FIG. 4 and FIG. 5, the liquid crystal display includes the thin film transistor array panel 100, the common electrode panel 200, the plurality of spacers 320 and the liquid crystal layer 3.

In an exemplary embodiment, the thin film transistor array panel 100 includes the substrate 110, the plurality of gate lines 121 including the gate electrodes 124, the plurality of storage electrode lines 131, the gate insulating layer 140, the plurality of semiconductors 154, the plurality of ohmic contacts 163 and 165, the plurality of data lines 171 including the source electrodes 173, the plurality of drain electrodes 175, and the insulating layer 380. The common electrode panel 200 includes the substrate 210 and the common electrode 270. The spacers 320 include the main spacer 320a and the auxiliary spacer 320b.

As compared with FIG. 1 to FIG. 3, the gate lines 121 do not include openings or subsidence portions. In an exemplary embodiment, the storage electrode lines 131 include openings 135, and the openings 135 do not overlap the data lines 171. The storage electrode line 131 may include enlarged parts 133 extended upwardly with respect to the openings 135.

The main spacer 320a overlaps the thin film transistor Q and the auxiliary spacer 320b overlaps the opening 135 of the storage electrode line 131.

The surface of the insulating layer 380 disposed under the auxiliary spacer 320b is lower than the surface of the insulating layer 380 disposed under the main spacer 320a, and accordingly the auxiliary spacer 320b may be formed away from the common electrode panel 200 by the predetermined interval d.

A liquid crystal display according to an exemplary embodiment of the present invention is described with reference to FIG. 6 to FIG. 9.

Figure 6:
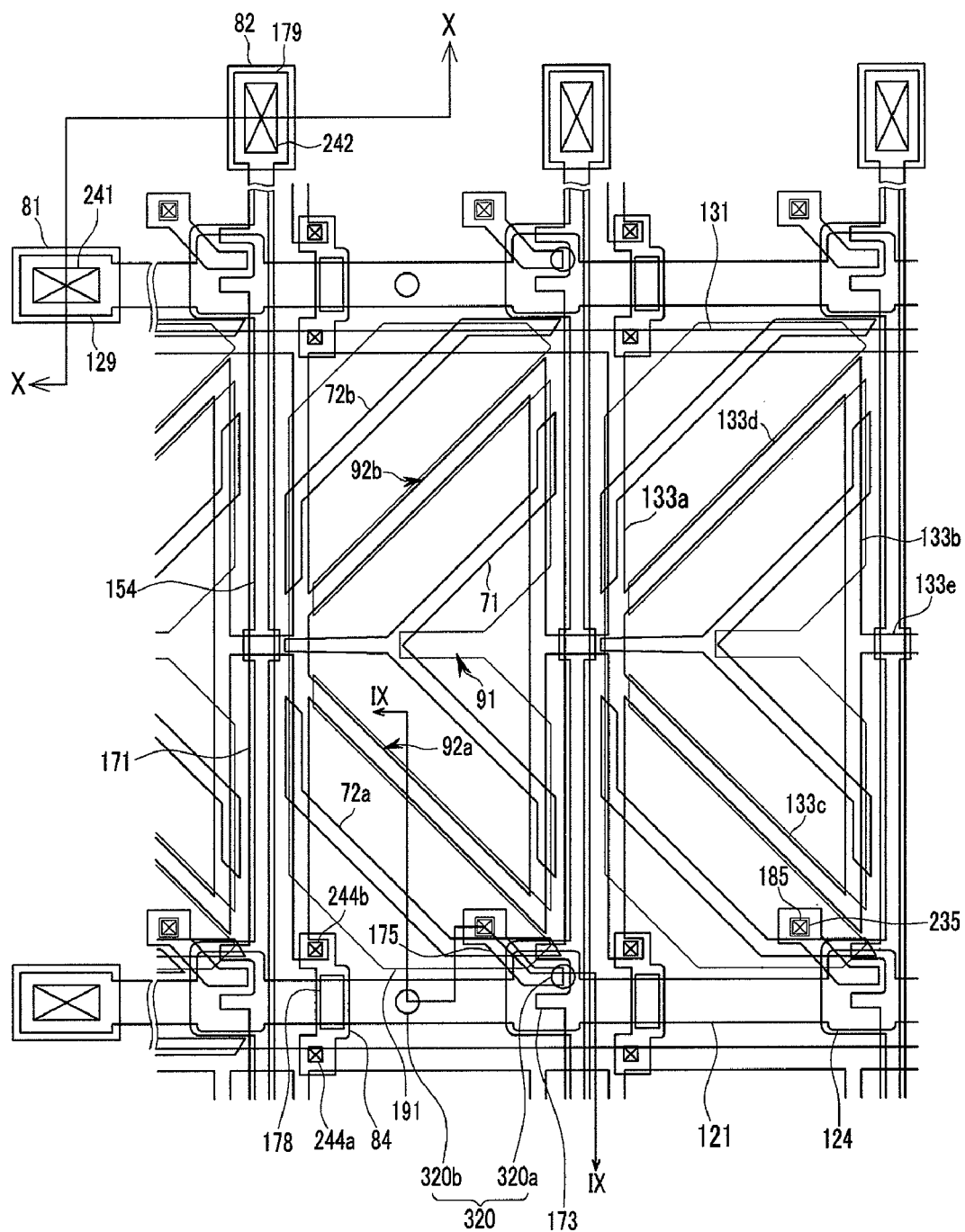
FIG. 6 is a layout view of a liquid crystal display according to an exemplary embodiment of the present invention.
Figure 7:
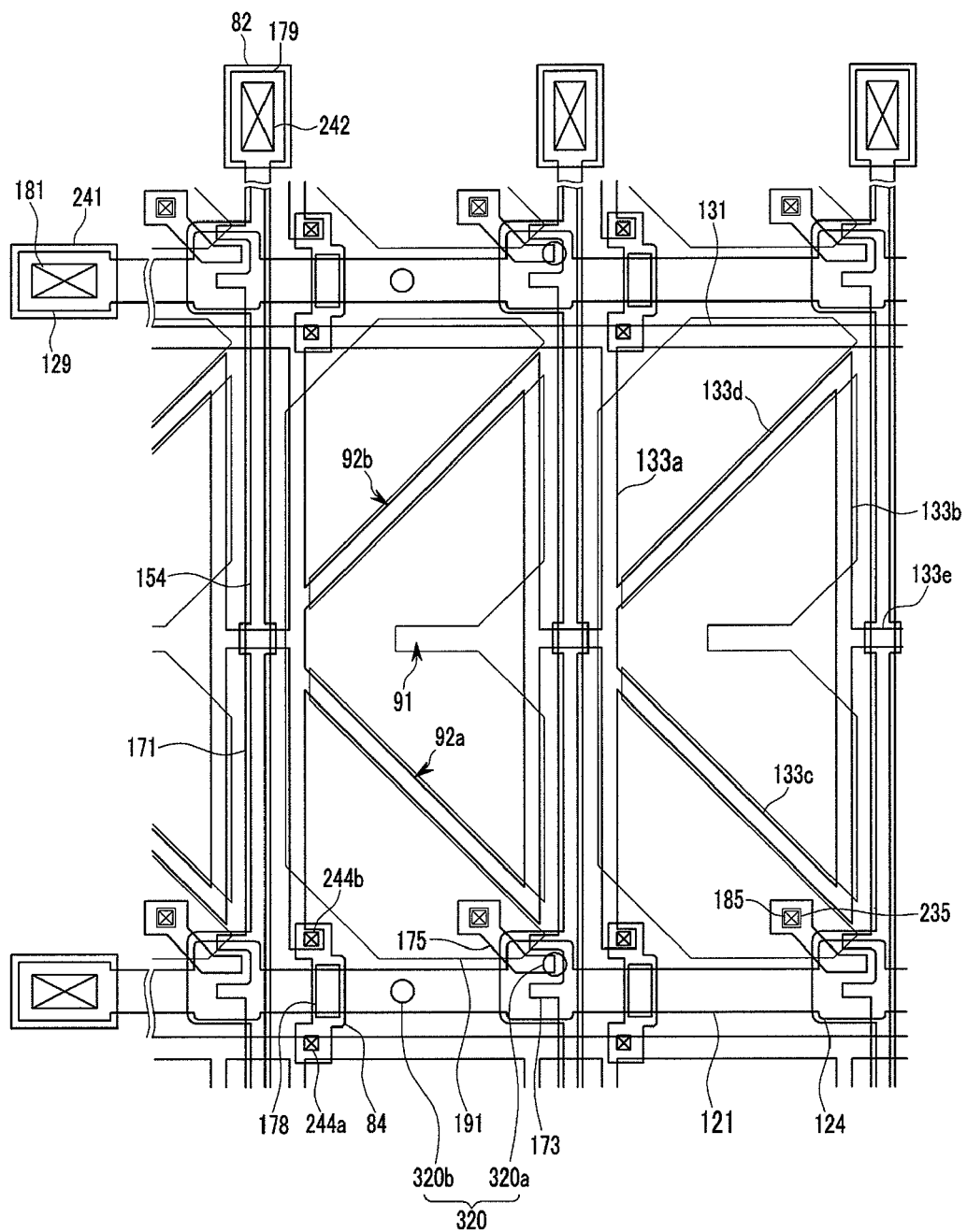
FIG. 7 is a layout view of a thin film transistor array panel and a spacer according to an exemplary embodiment of the present invention.
Figure 8:
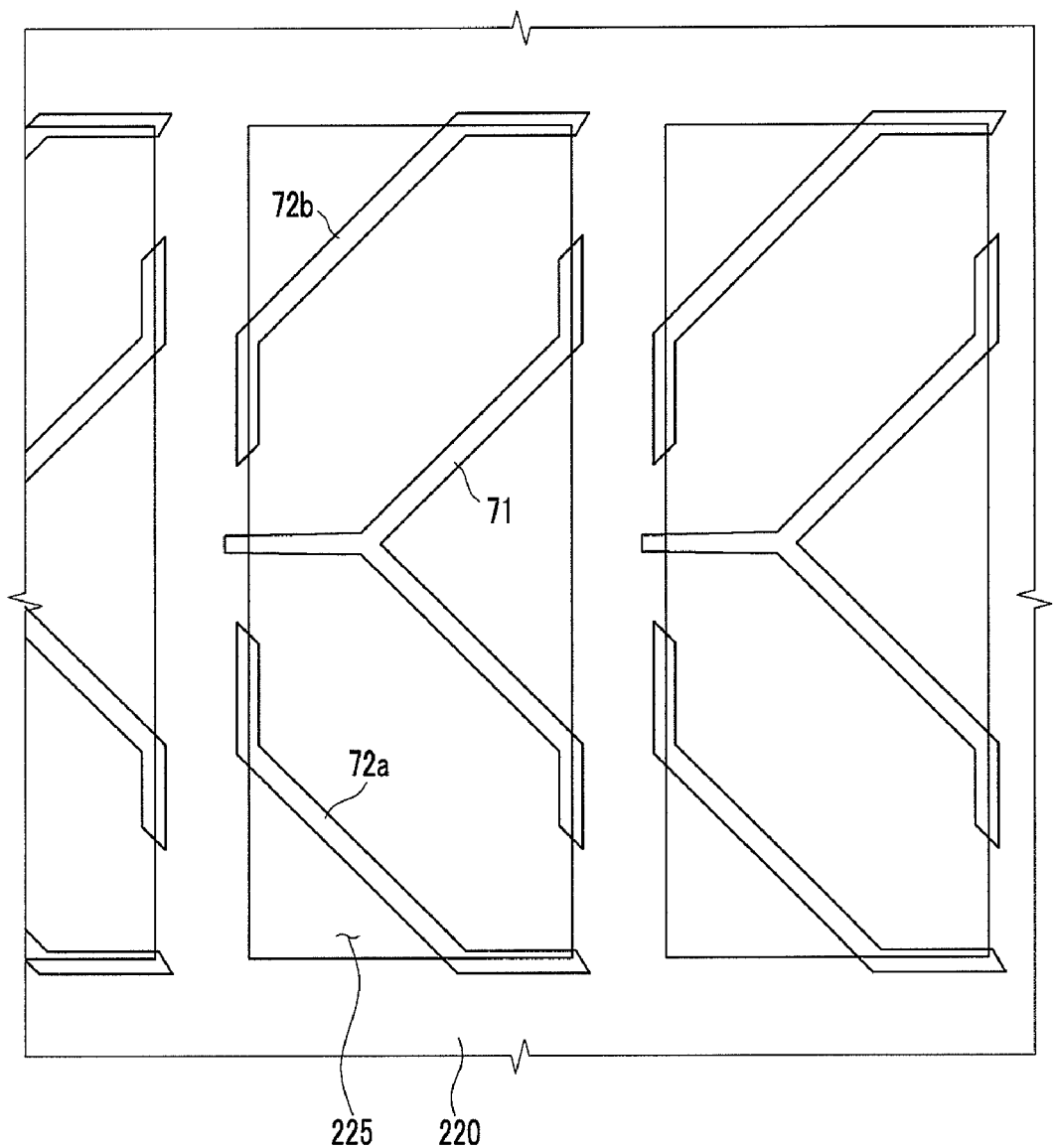
FIG. 8 is a layout view of a common electrode panel according to an exemplary embodiment of the present invention.
Figure 9:
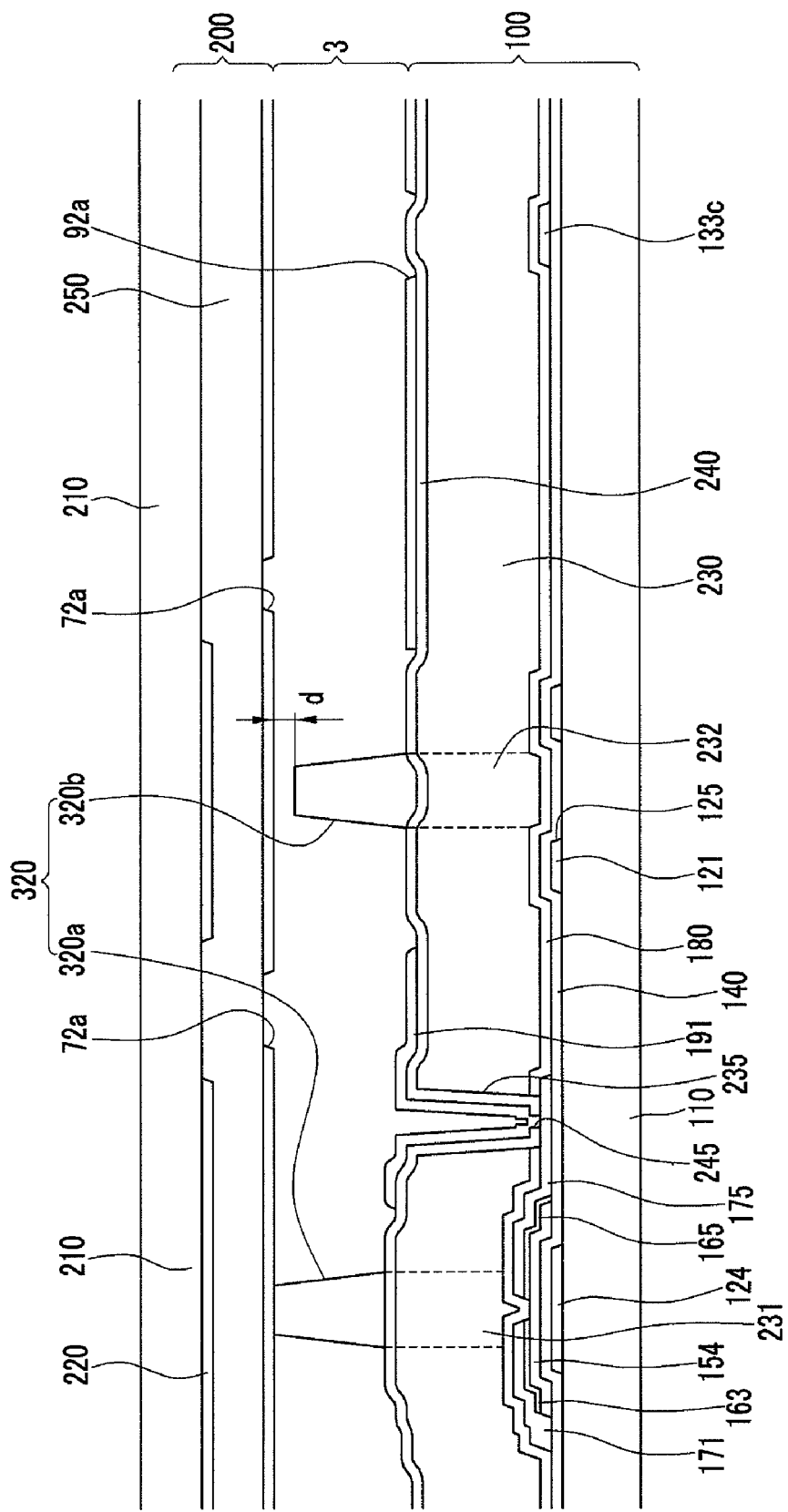
FIG. 9 is a cross-sectional view of a liquid crystal display shown in FIG. 6 taken along the line IX-IX.
Figure 10:
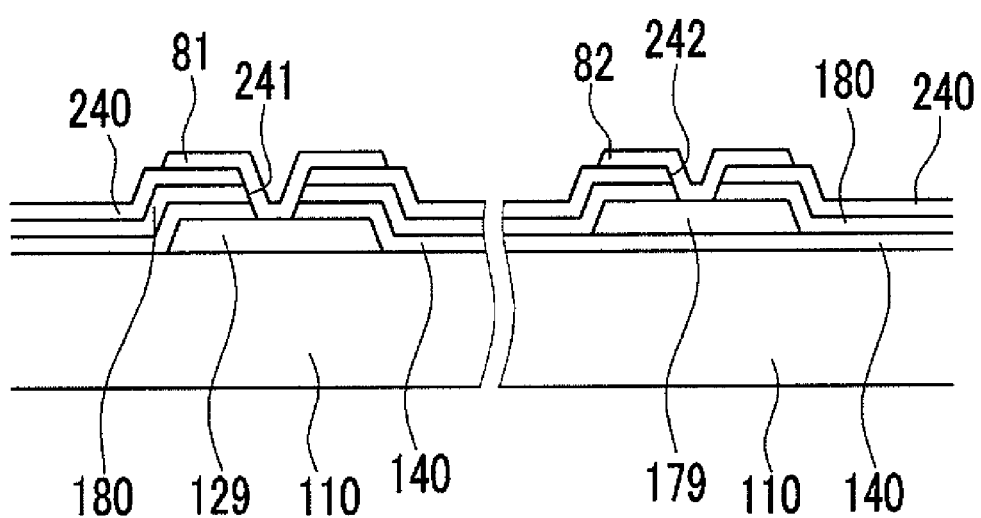
FIG. 10 is a cross-sectional view of a liquid crystal display shown in FIG. 6 taken along the line X-X.

FIG. 6 is a layout view of a liquid crystal display according to an exemplary embodiment of the present invention. FIG. 7 is a layout view of a thin film transistor array panel and a spacer according to an exemplary embodiment of the present invention. FIG. 8 is a layout view of a common electrode panel according to an exemplary embodiment of the present invention. FIG. 9 is a cross-sectional view of the liquid crystal display shown in FIG. 6 taken along the line IX-IX. FIG. 10 is a cross-sectional view of the liquid crystal display shown in FIG. 6 taken along the line X-X.

Referring to FIG. 6 to FIG. 10, a liquid crystal display includes the thin film transistor array panel 100, the common electrode panel 200, the liquid crystal layer 3, and the plurality of spacers 320.

The plurality of gate lines 121 and the plurality of storage electrode lines 131 are formed on the insulation substrate 110.

The gate lines 121 extend substantially in a transverse direction and transmit gate signals. Each gate line 121 includes the plurality of gate electrodes 124, the plurality of openings 125, and an end portion 129 having a large area for connection with another layer or an external driving circuit.

The openings 125 of the gate lines 121 are disposed between two neighboring data lines 171, and are open to expose the substrate 110. Accordingly, the depth of the openings 125 is the same as the thickness of the gate lines 121.

The storage electrode lines 131 receive a predetermined voltage, and include a stem line extending substantially parallel to the gate lines 121, a plurality of storage electrodes 133a, 133b, 133c, and 133d, and a plurality of connections 133e.

The gate insulating layer 140 is formed on the gate lines 121 and the storage electrode lines 131. The plurality of semiconductor stripes 154 comprising, for example, hydrogenated amorphous silicon (a-Si) or polycrystalline silicon are formed on the gate insulating layer 140.

The plurality of ohmic contacts 163 and 165 are formed on the semiconductors 154.

The plurality of data lines 171, the plurality of drain electrodes 175, and a plurality of isolated metal pieces 178 are formed on the ohmic contacts 163 and 165 and the gate insulating layer 140.

The data lines 171 transfer data signals and extend substantially in a vertical direction to cross the gate lines 121 and the stem lines and connections 133e of the storage electrode lines 131. Each data line 171 includes the plurality of source electrodes 173 extending toward the gate electrode 124 and the end portion 179 having a wide area for connection with a different layer or an external driving circuit. The drain electrode 175 is separated from the data line 171 and faces the source electrode 173 with respect to the gate electrode 124. The isolated metal piece 178 is positioned at an upper portion of the gate line 121 near the first storage electrode 133a.

The semiconductors 154 extend substantially in a vertical direction, and include a plurality of projections extending toward the gate electrodes 124. The semiconductors 154 include the exposed portions not covered by the data lines 171 and the drain electrodes 175, as well as portions disposed between the source electrodes 173 and the drain electrodes 175.

The ohmic contacts 163 and 165 reduce the contact resistance between the semiconductors 154 and the data lines 171 and between the semiconductors 154 and the drain electrodes 175.

A passivation layer 180 is formed on the data lines 171, the drain electrodes 175, the gate insulating layer 140, the isolated metal pieces 178, and the exposed portions of the semiconductors 154. The passivation layer 180 may comprise an inorganic insulator such as, for example, silicon nitride or silicon oxide.

A plurality of color filters 230 having a plurality of through-openings 235 are formed on the passivation layer 180. The color filters 230 comprise an organic material including pigments, and may display, for example, one of three primary colors of red, green, and blue.

The surface of the color filters 230 are curved or embossed according to the heights of the structures disposed thereunder. Accordingly, the height of the upper surface of the color filters 230 varies with reference to the substrate 110.

The passivation layer 180, the data lines 171, the drain electrodes 175, the ohmic contacts 163 and 165, the semiconductor 154, the gate insulating layer 140, and the gate lines 121 are formed under a first portion 231 of the color filter 230 overlapping the data lines 171 and the drain electrodes 175. The passivation layer 180 and the gate insulating layer 140 are formed under a second portion 232 of the color filters 230 overlapping the opening 125 of the gate lines 121. Accordingly, the upper surface of the first portion 231 is higher than the upper surface of the second portion, and the difference therebetween may be in a range of about 0.3 μm to about 0.5 μm.

The height of each portion of the color filters 230 is increased according to an increase of the height of the structures disposed thereunder. The degree of the height difference of the surface of the color filters 230 according to the height of the structures may be changed according to the material of the pigments included in the color filters 230.

A capping layer 240 is formed on the color filters 230. The capping layer 180 may prevent dispersion of the color filter 230 and may suppress contamination of the liquid crystal by an organic material such as a solvent of the color filter such that deterioration like an afterimage may be prevented. The capping layer 240 and passivation layer 180 have a plurality of contact holes 242 and 245 respectively exposing the end portions 179 of the data lines 171 and the drain electrodes 175. The capping layer 240, the passivation layer 180, and the gate insulating layer 140 have a plurality of contact holes 241, 244a, and 244b respectively exposing the end portions 129 of the gate lines 121 and portions of the storage electrode lines 131.

The plurality of pixel electrodes 191, a plurality of contact assistants 81 and 82, and a plurality of overpasses 84 are formed on the capping layer 240. These may comprise a transparent conductive material such as, for example, ITO or IZO, or a reflective metal such as, for example, aluminum, silver, or an alloy thereof. The pixel electrode 191 is physically and electrically connected to the drain electrode 175 through the contact hole 245.

The pixel electrodes 191 overlap the storage electrode lines 131 as well as the storage electrodes 133a, 133b, 133c, and 133d. The pixel electrodes 191 include a plurality of cutouts 91, 92a, and 92b, and the pixel electrodes 191 are divided into a plurality of partitions by the cutouts 91, 92a, and 92b. In an exemplary embodiment of the present invention, the number of cutouts varies depending on design factors such as, for example, the size of the pixel electrodes 191, the length ratio of the horizontal side and the longitudinal side of the pixel electrodes 191, or the type of liquid crystal layer 3.

The contact assistants 81 and 82 are connected to the ends 129 of the gate lines 121 and the ends 179 of the data lines 171 through the contact holes 241 and 242, respectively. The contact assistants 81 and 82 complement the attachment of the ends 129 of the gate lines 121 and the ends 179 of the data lines 171 to external devices, and protect the ends 129 of the gate lines 121 and the ends 179 of the data lines 171. The overpasses 84 cross the gate lines 121, and are connected to the exposed parts of the storage electrode lines 131 through the contact holes 244a and 244b located at opposite sides with the gate lines 121 interposed therebetween. The storage electrode lines 131 may be used to repair defects of the gate lines 121, the data lines 171, or the thin film transistors with the overpasses 83.

The common electrode panel 200 is described with reference to FIG. 6, FIG. 8, and FIG. 9 according to an exemplary embodiment of the present invention.

A light blocking member 220 is formed on the substrate 210. The light blocking member 220 defines a plurality of open regions 225 facing the pixel electrodes 191 and having a same shape as the pixel electrodes 191. The light blocking member 220 blocks light leakage between the pixel electrodes 191. An insulating layer 250 for providing a flat surface is formed on the light blocking member 220. The insulating layer 250 may be omitted.

A common electrode 270 comprising a transparent conductor such as ITO or IZO is formed on the insulating layer 250. The common electrode 270 includes a plurality of cutouts 71, 72a, and 72b. The shape of the cutouts 71, 72a, and 72b may be changed.

Referring to FIG. 6 and FIG. 9, a liquid crystal layer 3 is formed between the thin film transistor array panel 100 and the common electrode panel 200.

Spacers 320 are disposed between the common electrode panel 200 and the thin film transistor array panel 100, and the thickness of the liquid crystal layer 3 may be determined by the spacers 320.

Each spacer 320 includes the main spacer 320a and the auxiliary spacer 320b. The main spacer 320a is disposed on the same vertical line as the data line 171 and the drain electrode 175 to overlap the data line 171 and the drain electrode 175. The auxiliary spacer 320b is disposed on the same vertical line as the opening 125 of the gate line 121 to overlap the opening 125. The main spacer 320a contacts the common electrode panel 200, and the auxiliary spacer 320b is separated from the common electrode panel 200 by a predetermined interval d. The interval d may be in a range of about 0.3 μm to about 0.5 μm. If the interval d between the auxiliary spacer 320b and the common electrode panel 200 is less than 0.3 μm, the liquid crystal margin is not obtained such that the AUA deterioration may be generated. If the interval d is more than 0.5 μm, an external force exerted on the main spacer 320a is not dispersed such that the main spacer 320a may be damaged.

The interval d between the auxiliary spacer 320b and the common electrode panel 200 may be determined by the height difference of the first portion 231 and the second portion of the color filter 230. The height difference between the two portions 231 and 232 may be controlled according to the pigments included in the color filter 230.

The main spacer 320a and the auxiliary spacer 320b are disposed in an area defined by crossing points of the plurality of gate lines 121 and the plurality of data lines 171. The color filters of red, green, and blue may be alternatively disposed according to one direction. For example, the main spacer 320a and the auxiliary spacer 320b may be disposed on only the blue color filters and not on the red and green color filters.

In an exemplary embodiment, the opening 125 of the gate line 121 may be formed in the storage electrode line 131, not in the gate line 121. In this case, the auxiliary spacer 320b may overlap the opening formed in the storage electrode line 131. In an exemplary embodiment, a subsidence portion may be formed in substitution for the opening 125 of the gate line 121.

The present disclosure may be adapted to various kinds of display devices including a spacer.

Although the illustrative embodiments of the present invention have been described herein with reference to the accompanying drawings, it is to be understood that the present invention should not be limited to those precise embodiments and that various other changes and modifications may be affected therein by one of ordinary skill in the related art without departing from the scope or spirit of the invention. All such changes and modifications are intended to be included within the scope of the invention as defined by the appended claims.

What is claimed is:

1. A liquid crystal display comprising:
a first substrate;
a first signal line formed on the first substrate, the first signal line including a first portion and a second portion, wherein the cross-section of the second portion is thinner than the cross-section of the first portion;
a second signal line insulated from the first signal line, the second signal line crossing the first signal line;
a thin film transistor connected to the second signal line;
a pixel electrode connected to the thin film transistor;
an insulating layer formed on the first signal line, the second signal line, and the thin film transistor, the insulating layer including a first portion and a second portion;
a first spacer formed on the first portion of the insulating layer; and
a second spacer formed on the second portion of the insulating layer,
wherein the second portion of the insulating layer overlaps the second portion of the first signal line, and
the first portion and the second portion of the insulating layer have different surface heights.

2. The liquid crystal display of claim 1, wherein the insulating layer comprises an organic material layer.

3. The liquid crystal display of claim 1, further comprising a second substrate facing the first substrate,
wherein the second substrate contacts the first spacer and is separated from the second spacer.

4. The liquid crystal display of claim 3, wherein the second portion of the first signal line is separated from the second signal line and the thin film transistor.

5. The liquid crystal display of claim 4, wherein the first portion of the insulating layer overlaps the thin film transistor.

6. The liquid crystal display of claim 5, wherein lengths of the first spacer and the second spacer are substantially the same.

7. The liquid crystal display of claim 6, wherein the interval between the second spacer and the second substrate is in a range of about 0.3 μm to about 0.5 μm.

8. The liquid crystal display of claim 6, wherein a difference between a surface height of the first portion of the insulating layer and a surface height of the second portion of the insulating layer is in a range of about 0.3 μm to about 0.5 μm.

9. The liquid crystal display of claim 6, wherein a cross-section of the first spacer is substantially the same as a cross-section of the second spacer.

10. The liquid crystal display of claim 9, wherein the cross-section of the first spacer and the second spacer is substantially circular, and a diameter of the widest cross-section of the first spacer and the second spacer is in a range of about 17 μm to about 20 μm.

11. The liquid crystal display of claim 1, wherein the insulating layer is a color filter including pigments.

12. The liquid crystal display of claim 11, wherein the color filter includes blue pigments.

13. The liquid crystal display of claim 12, further comprising
a passivation layer formed between the thin film transistor and the insulating layer or on the insulating layer.

14. The liquid crystal display of claim 12, further comprising:
a passivation layer formed between the thin film transistor and the insulating layer; and
a capping layer formed on the insulating layer.

15. The liquid crystal display of claim 1, wherein the thin film transistor is connected to the first signal line.

16. The liquid crystal display of claim 1, further comprising
a third signal line formed with a same layer as the first signal line, wherein the third signal line crosses the second signal line, and is connected to the thin film transistor.

17. The liquid crystal display of claim 16, wherein the first signal line has a wider width in layout view near the second portion of the first signal line than at remaining portions of the first signal line.

18. A liquid crystal display comprising:
a first substrate;
a plurality of gate lines formed on the first substrate, the plurality of gate lines including first portions and second portions, wherein the cross-sections of the second portions are thinner than the cross-sections of the first portions;
a gate insulating layer formed on the gate lines;
a plurality of data lines formed on the gate insulating layer, the plurality of data lines crossing the gate lines to define a plurality of pixel areas, and the plurality of data lines including source electrodes;
a plurality of drain electrodes facing the source electrodes with an interval therebetween;
a plurality of color filters formed on the gate lines, the gate insulating layer, the data lines, and the drain electrodes, the plurality of color filters including first portions and second portions;
first spacers formed on the first portions of the color filters;
second spacers formed on the second portions of the color filters; and
a second substrate facing the first substrate, the second substrate contacting the first spacers, and separated from the second spacers,
wherein the second portions of the color filters overlap the second portions of the gate lines, and
heights of a surface of first portions and a surface of the second portions of the color filters are different.

19. The liquid crystal display of claim 18, wherein color filters of red, green, and blue are alternately disposed in the pixel areas, and
the first spacers and the second spacers are disposed only on the blue color filters and not on the red and green color filters.

20. The liquid crystal display of claim 19, wherein the second portions of the gate lines are separated from the source electrodes and the drain electrodes.

21. The liquid crystal display of claim 20, wherein the first portions of the color filters overlap the source electrodes and the drain electrodes.

* * * * *